(12) United States Patent
Cooper et al.

(10) Patent No.: US 7,284,287 B2
(45) Date of Patent: Oct. 23, 2007

(54) DUAL PURPOSE LAVATORY

(75) Inventors: Ben M. Cooper, Lynnwood, WA (US); Allan B. Lewis, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 155 days.

(21) Appl. No.: 10/782,206

(22) Filed: Feb. 18, 2004

(65) Prior Publication Data

US 2004/0163170 A1 Aug. 26, 2004

Related U.S. Application Data

(60) Provisional application No. 60/448,938, filed on Feb. 21, 2003.

(51) Int. Cl.
*A47K 4/00* (2006.01)
(52) U.S. Cl. .......................................................... 4/664
(58) Field of Classification Search .................... 4/663, 4/664; 244/118.5, 129.4, 129.5, 118.6
See application file for complete search history.

(56) References Cited

U.S. PATENT DOCUMENTS

| | | | | |
|---|---|---|---|---|
| 2,650,368 A | * | 9/1953 | Evans | .......................... 52/34 |
| 4,202,061 A | * | 5/1980 | Waters | ........................... 4/317 |
| 4,868,936 A | * | 9/1989 | Crocoli | ........................... 4/663 |
| 4,884,767 A | * | 12/1989 | Shibata | ..................... 244/118.5 |
| 5,426,900 A | * | 6/1995 | Springer | ...................... 52/79.1 |
| 5,474,260 A | * | 12/1995 | Schwertfeger et al. | ... 244/118.5 |
| 6,604,709 B1 | * | 8/2003 | Wentland et al. | ......... 244/118.5 |
| D487,137 S | * | 2/2004 | Itakura | ...................... D23/274 |

FOREIGN PATENT DOCUMENTS

| | | | |
|---|---|---|---|
| DE | 445157 | | 6/1927 |
| EP | 0221260 | | 5/1987 |
| EP | 0953309 | | 11/1999 |
| GB | 2348215 A | * | 9/2000 |
| NL | 6504258 | | 10/1966 |

* cited by examiner

*Primary Examiner*—Huyen Le
(74) *Attorney, Agent, or Firm*—Lee & Hayes, PLLC (57) ABSTRACT

Dual purpose lavatory units are disclosed. In one embodiment, a lavatory unit includes a first section, a second section, and a divider wall separating the first and second sections. The first section includes a commode and the second section includes at least one of a urinal and a sink. The dual-purpose lavatory may be constructed as a unit that is mountable in a vehicle such as an aircraft.

26 Claims, 8 Drawing Sheets

DUAL PURPOSE LAVATORY

PRIORITY CLAIM

This application claims priority from U.S. Provisional Application Ser. No. 60/448,938, filed Feb. 21, 2003, which is hereby incorporated by reference.

FIELD OF THE INVENTION

This invention relates to aircraft and, more specifically, to aircraft lavatories.

BACKGROUND OF THE INVENTION

Lavatories, especially aircraft lavatories, provide a private space where users can perform daily functions or just freshen up. Many single occupant lavatories include a toilet and a sink. Thus, if a person just wants to brush their teeth or just freshen up they are occupying total lavatory time. As such, waiting times or queues may be present because the cycle time through the lavatories may be lengthy. Therefore, there exists a need to speed up cycles through the lavatories, thus shortening users' waits and reducing queues.

Also, many large commercial passenger planes include a 2-5-2 seat layout. Because of this layout, the depth of a lavatory is typically about 41" to ensure that aisle width meets regulatory compliance. However, in some recent large commercial passenger plane designs a 3-3-3 seat layout was introduced. These new designs include the lavatories designed for the 2-5-2 seat layout, thereby resulting in unused space between the lavatory and the aisle. Therefore, there is another unmet need to more efficiently use space allowable for a lavatory in a vehicle such as an aircraft.

SUMMARY OF THE INVENTION

The present invention relates to apparatus and methods for dual-purpose lavatory units. In one embodiment, a lavatory unit includes a first section, a second section, and a divider wall separating the first and second sections. The first section includes a commode and the second section includes at least one of a urinal and a sink.

The present invention may provide a more efficient use of space allotted to a lavatory unit within a vehicle or other structure, including an aircraft. In some embodiments, the present invention allows for faster cycle time through the lavatories by enabling people who don't have to use the toilet to be able to use a sink and mirror to freshen up. The present invention may also allow more seats to be added to a vehicle, because fewer lavatories may be needed due to the reduced cycle time.

BRIEF DESCRIPTION OF THE DRAWINGS

The preferred and alternative embodiments of the present invention are described in detail below with reference to the following drawings.

DETAILED DESCRIPTION OF THE INVENTION

The present invention relates to apparatus and methods for providing more efficient use of lavatory space. Many specific details of certain embodiments of the invention are set forth in the following description and in FIGS. 1-8 to provide a thorough understanding of such embodiments. One skilled in the art, however, will understand that the present invention may have additional embodiments, or that the present invention may be practiced without several of the details described in the following description.

Figure 1:
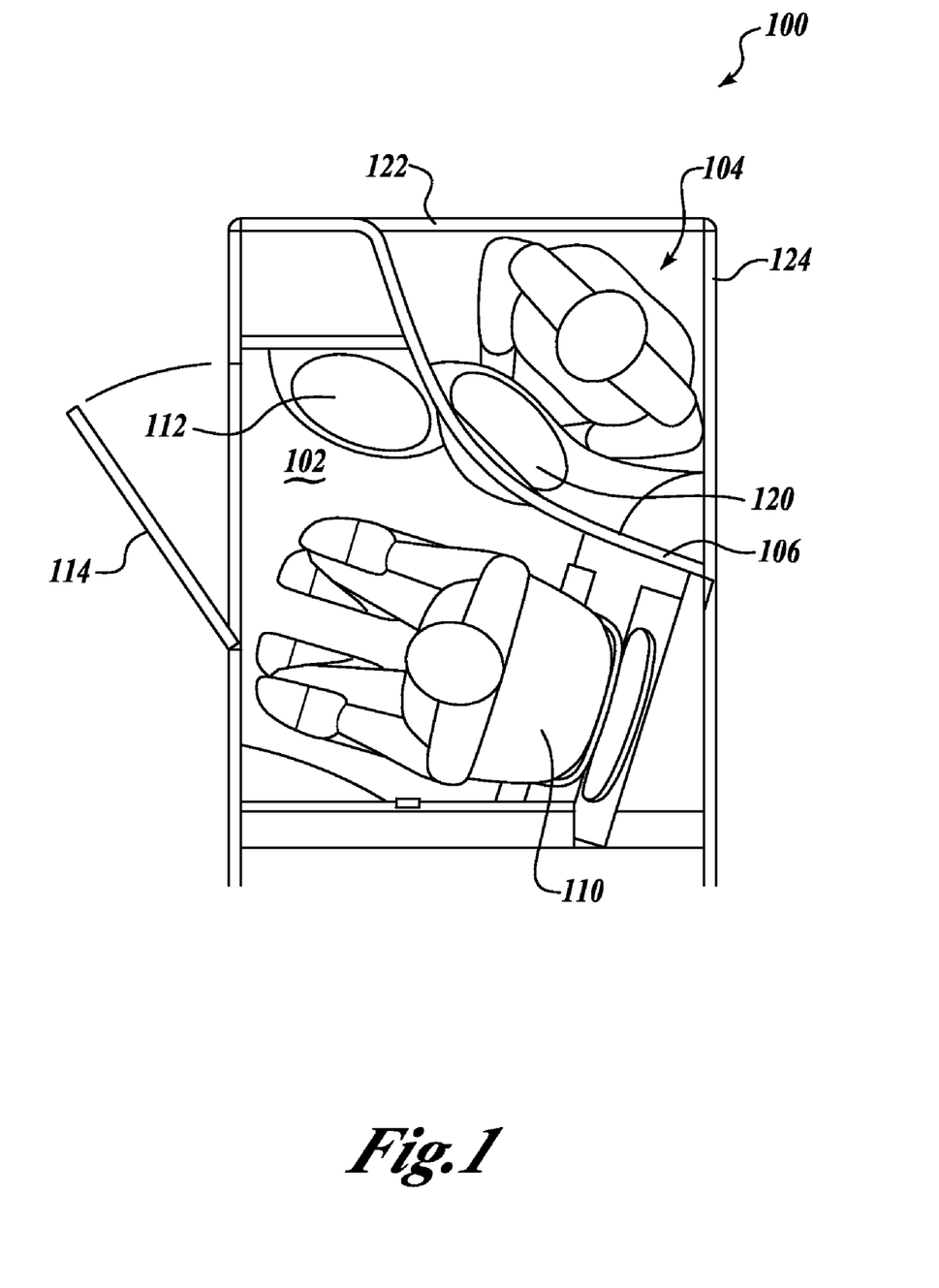
FIG. 1 is a floor plan view of a first embodiment of the present invention.

FIG. 1 illustrates a top elevational view of an embodiment of a lavatory unit 100 (with a top or roof removed) in accordance with an embodiment of the invention. This embodiment may, for example, be used in aircraft with a 3-3-3 seat layout. The lavatory unit 100 may be used in aircraft with other cabin seat layout designs, in other vehicles (e.g. ships, buses, trains, subways, monorails, etc.), or as stand alone units. The lavatory unit 100 includes a first section 102 and a second section 104 that are separated by an interior wall 106. In this embodiment, the lavatory unit 100 is rectangular. The interior wall 106 is curved and is attached to adjacent exterior walls. The first section 102 suitably includes a commode 110 and a sink 112. A door 114 allows access to and from the first section 102. The commode 110 and the sink 112 are positioned to allow for optimum use of space and to provide occupant comfort.

The second section 104 includes a urinal 120 suitably positioned along the interior wall 106 that is concave towards the center of the second section 104. In a non-limiting example, a moveable curtain or door 122 is attached to a track between the interior wall 106 and an exterior wall 124. It will be appreciated that other closure devices can be used to provide privacy to an occupant of the second section 104, such as, without limitation, a hinged or folding door.

Embodiments of lavatory units in accordance with the present invention may provide significant advantages over the prior art. For example, cycle times through the lavatories may be greatly enhanced in comparison with the prior art lavatory. Persons wishing to use the sink 112 or the toilet 110 in the first section 102 may do so without preventing others from using the urinal 120 within the second section 104. Because the first and second sections 102, 104 are able to be used simultaneously, there may be decreased waiting times and shorter queues for persons wishing to use the lavatory. This may be particularly important in certain applications, including aircraft applications for which shorter queues and reduced waiting times may be important for a variety of reasons. Thus, the dual purpose lavatory unit may provide a superior facility in comparison with prior art lavatory facilities.

Furthermore, embodiments of lavatory units in accordance with the present invention may provide improved utilization of space within modern commercial aircraft. More specifically, for aircraft designs having a 3-3-3 seat layout, embodiments of lavatory units in accordance with the present invention may provide improved utilization of space between the lavatory and the aisle in comparison with prior art lavatory facilities.

Figure 2:
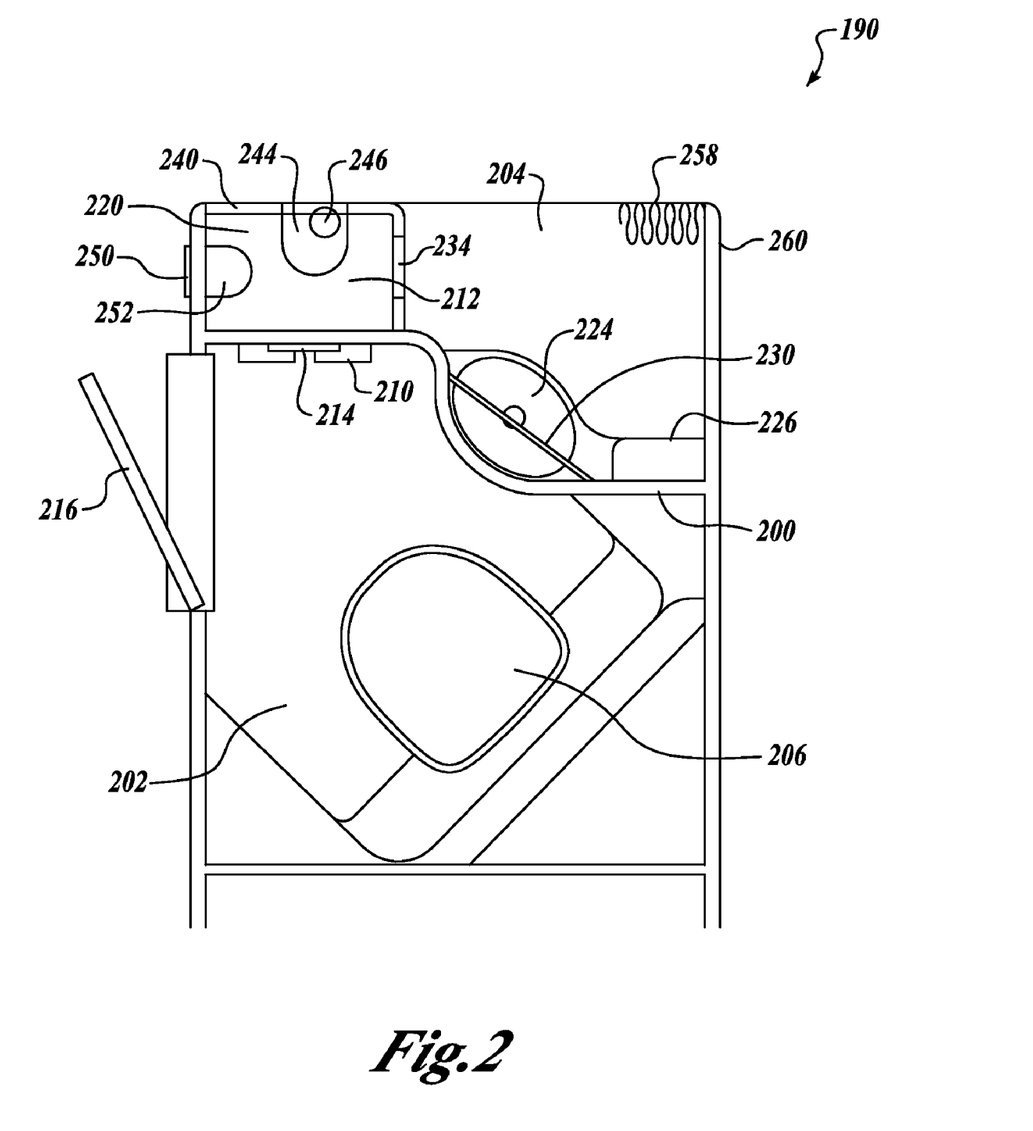
FIG. 2 is a top elevational view of a second embodiment of the present invention.

An alternate embodiment of a toilet unit 190 is shown in FIG. 2. The toilet unit 190 includes an arcuate or S-shaped wall 200 that separates a first section 202 from a second section 204 and is attached to opposing walls. The first section 202 includes a toilet 206, a toilet paper dispenser 210, and a wastebasket access door 214. The toilet paper dispenser 210 and the wastebasket access door 214 are positioned on the S-shaped wall 200 within reaching distance of the toilet 206 and are adjacent to a door 216. The wastebasket access door 214 provides access to a wastebasket cabinet 212 positioned behind the S-shaped wall 200.

The second section 204 includes a sink 224 attached to the S-shaped wall 200. An amenities cabinet 226 is positioned along the S-shaped wall 200 adjacent to the sink 224. A mirror 230 is mounted on the S-shaped wall 200 above the sink 224. A wastebasket access door 234 is positioned on the wastebasket cabinet 212 between the S-shaped wall 200 and an exterior wall 240. A drinking fountain 244 and a cup dispenser 246 are located above the wastebasket cabinet 212. In one embodiment the drinking fountain 244 is accessible to users from outside of the second section 204.

The wastebasket cabinet 212 may include a foot-powered compactor 250. The foot-powered compactor 250 is operated by a foot pedal 252. Alternatively, the foot-powered compactor 250 may be an electrically powered compactor.

As further shown in FIG. 2, in this embodiment, a moveable curtain 258 is attached to an exterior wall 260 of the second section 204. The curtain 258 provides privacy to an occupant by sliding along a track or rail and connecting to the other exterior wall 240 that encloses the second section 204. It will be appreciated that other privacy devices can be used, such as, without limitation, a hinged or folding door. Various cabinets may be located in convenient locations within the first and second sections 202 and 204 as desired for a particular application.

It will be appreciated that the above-noted advantages may be achieved using alternate embodiments of the invention, including the embodiment described above and shown in FIG. 2. Because the first and second sections 202, 204 are able to be used simultaneously, there may be decreased waiting times and shorter queues for persons wishing to use the lavatory. Persons needing to use only the sink 224 may do so without preventing other persons from using the toilet 206 in the first section 202. Also, because the lavatory unit 190 is divided into first and second sections 202, 204 by the arcuate wall 200, the lavatory unit 190 may provide improved utilization of space within modern commercial aircraft.

FIGS. 3-7 illustrate a lavatory unit 280 in accordance with yet another embodiment of the invention. In this embodiment, the lavatory unit 280 includes a divider wall 286 that extends from a floor 325 to a ceiling 327 (FIG. 4) and separates a first section 281 from a second section 320. The first section 281 includes a first sink 282 and a toilet 284. The first sink 282 is mounted to the divider wall 286 and a waste cabinet wall 288 that connects the divider wall 286 to an exterior wall 290. A waste cabinet door 292 is located above the first sink 282 on the waste cabinet wall 288 for allowing access to a waste cabinet 293. Amenities 296, a mirror 298, and a storage cabinet 300 are located above and behind the toilet 284. A folding, baby changing table 306 is mounted on an exterior wall 308 adjacent to the toilet 284. The baby changing table 306 stows in a vertical position. A toilet paper dispenser 310 is located adjacent to the baby changing table 306.

Figure 3:
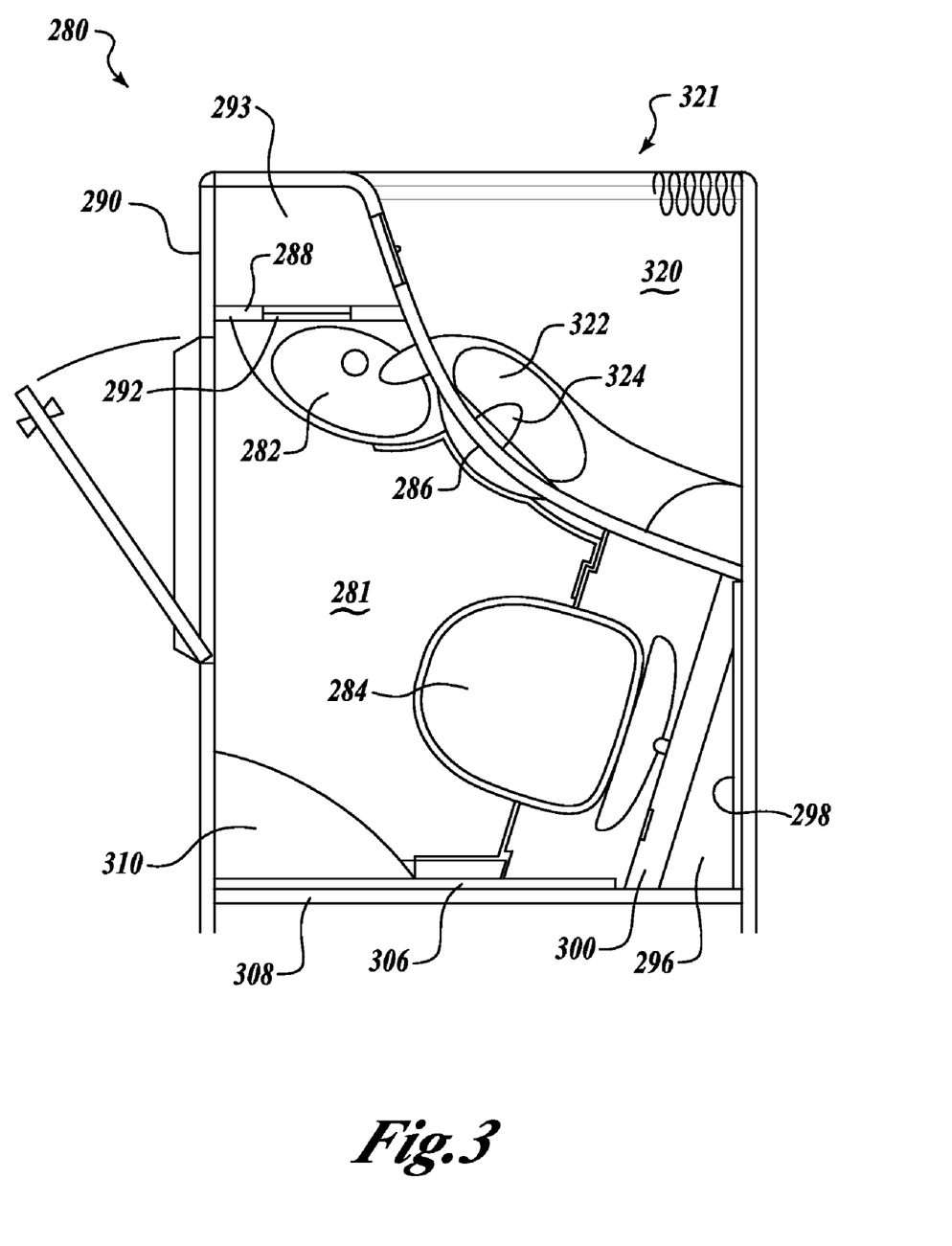
FIG. 3 is a top elevational view of a third embodiment of the present invention.
Figure 4:
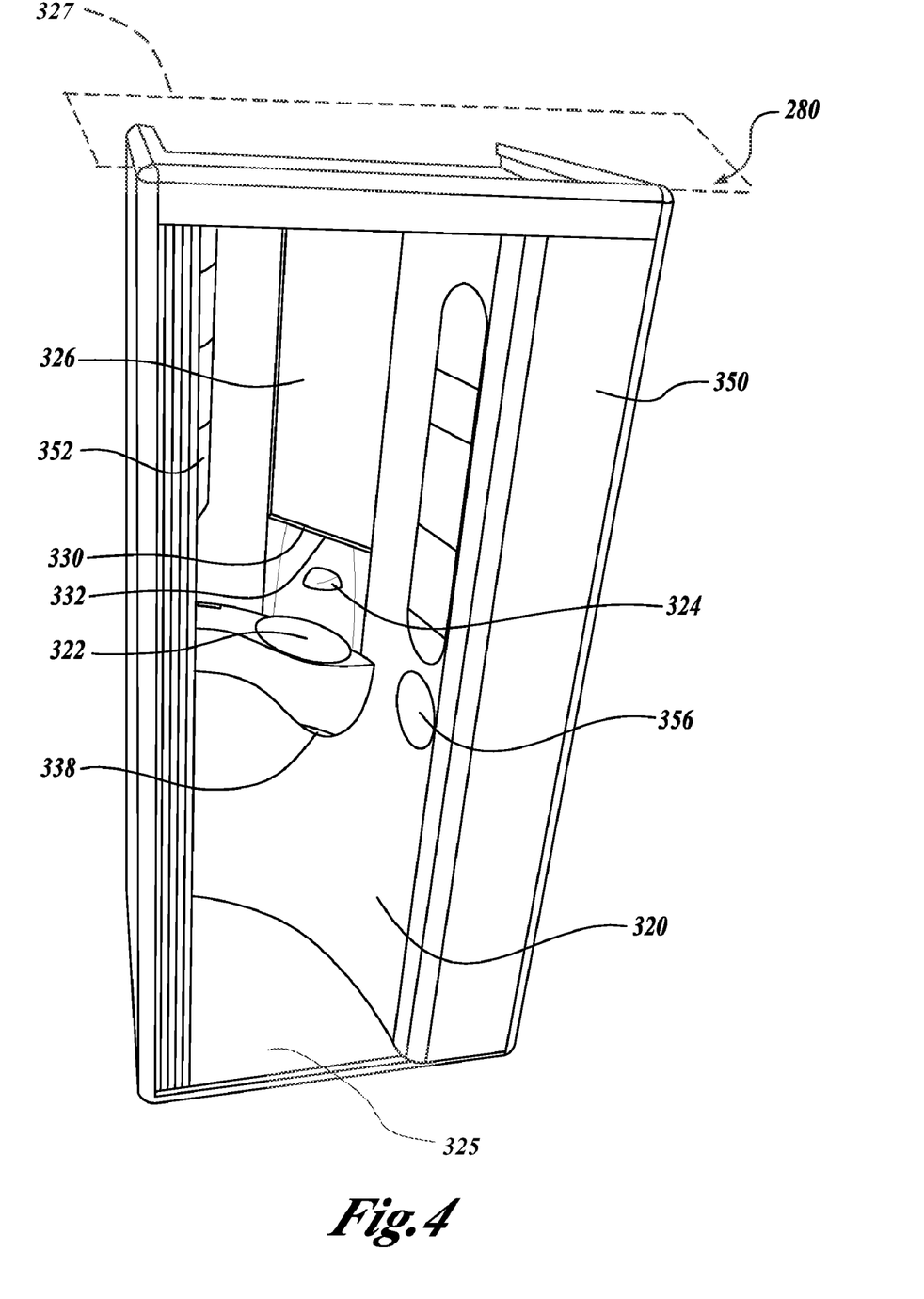
FIGS. 4-7 are perspective views of the embodiment shown in FIG. 3.

Referring to FIG. 4, the second section 320 includes a second sink 322 with a motion controlled faucet 324. A mirror 326 is located above the faucet 324. A soap dispenser 330 and a sink light 332 are located under the mirror 326 and above the second sink 322. A floor light 338 is located below the second sink 322 for illuminating the floor 325 of the second section 320. Storage and amenities cabinets 350 and 352 are located adjacent to both sides of the second sink 322. The storage and amenities cabinets 350 and 352 include storage for various amenities, such as, without limitation, lotions and tissues, and storage for sanitation items. The storage cabinet 300 located to the right of the second sink 322 when facing the second sink 322 includes a waste cabinet door 356 for providing access to the waste cabinet 293 (FIG. 3).

Figure 5:
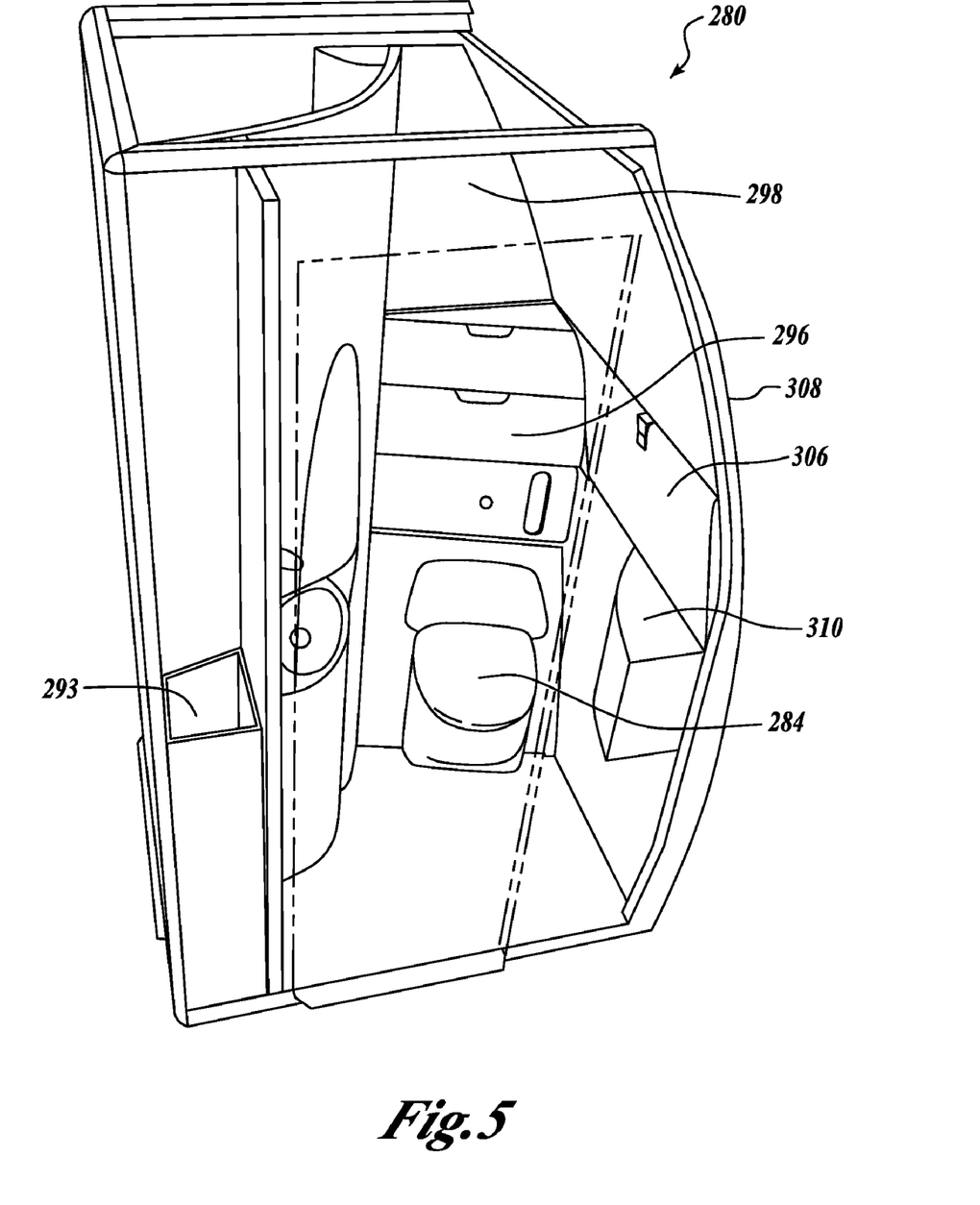
Figure 6:
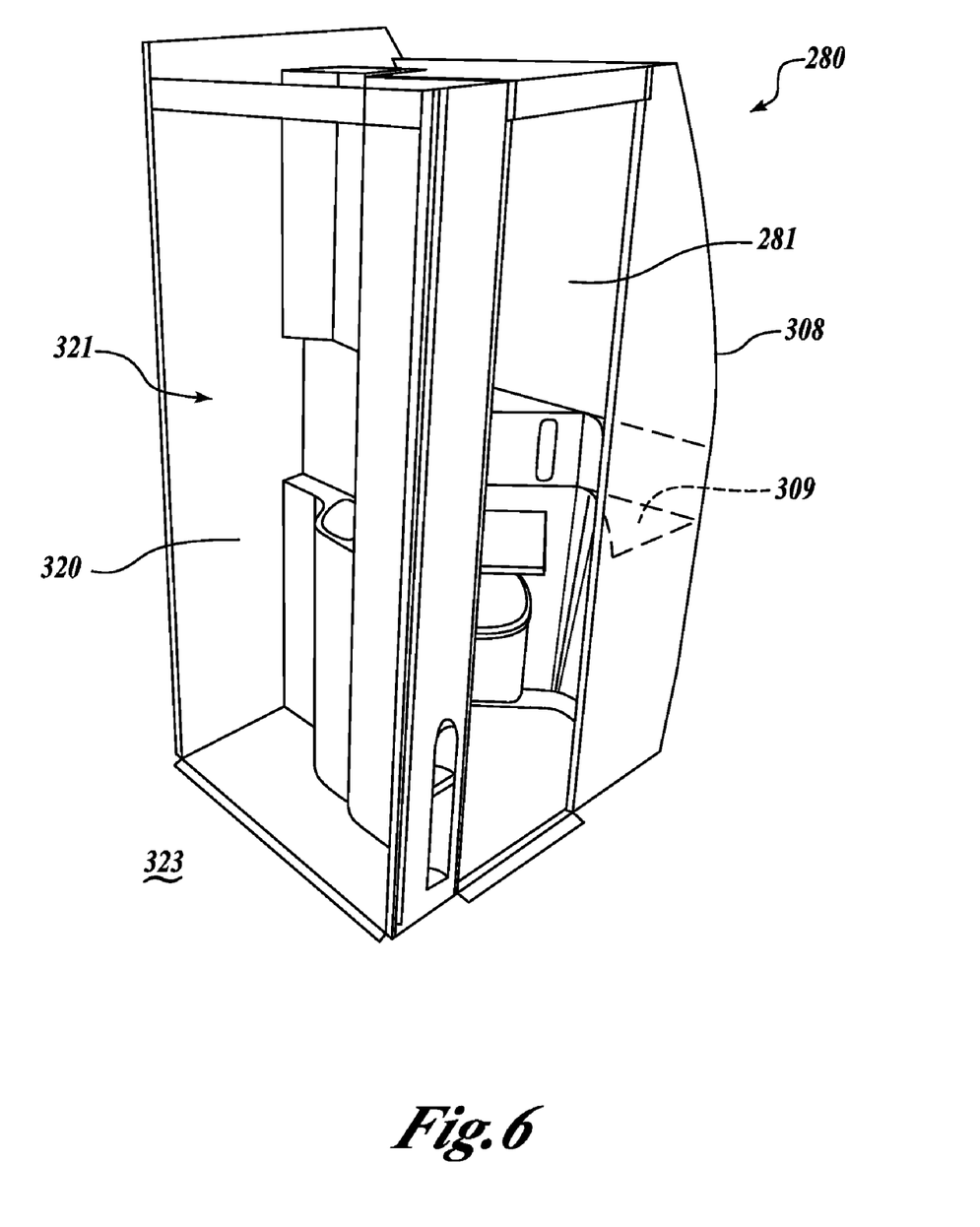
Figure 7:
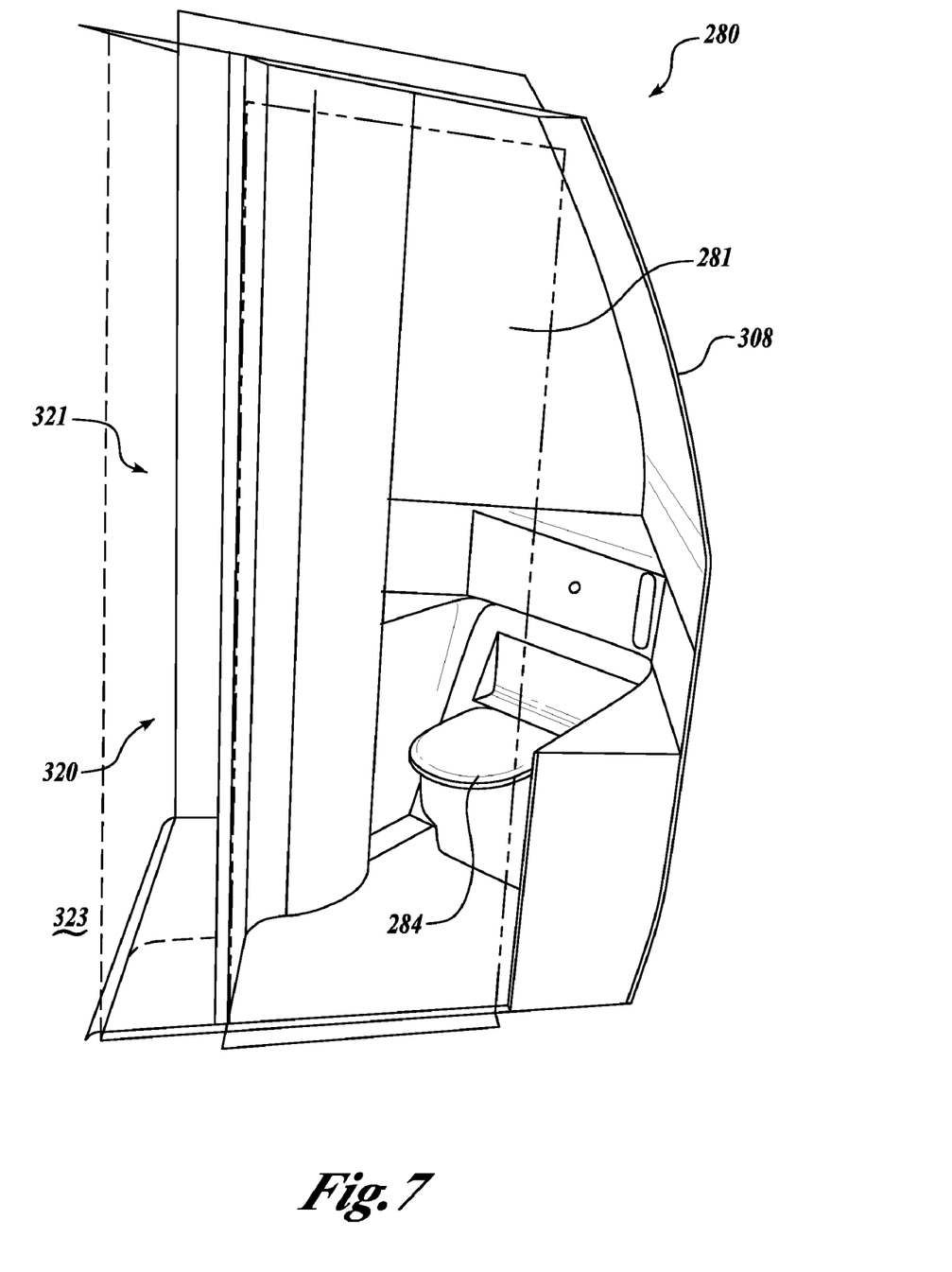

FIGS. 5-7 are additional perspective views of the lavatory unit 280 shown in FIGS. 3 and 4, with portions of outer walls cut-away or removed to facilitate identification of interior components. Referring to FIG. 6, the lavatory unit 280 may be positioned in an aircraft such that the exterior wall 308 of the first section 281 is formed to attach to or is positioned adjacent to a fuselage bulkhead 309 of the aircraft. In that case, the opening 321 of the second section 320 is adjacent to an aisle 323 of the aircraft. With regards to the lighting used within the embodiments of the present invention, U.S. patent application Ser. No. 10/097,944 is hereby incorporated by reference.

Again, it will be appreciated that the above-noted advantages may be achieved through alternate embodiments of the type described above with reference to FIGS. 3-7. Because the first and second sections 281, 320 are able to be used simultaneously, there may be decreased waiting times and shorter queues for persons wishing to use the lavatory unit 280, and the lavatory unit 280 may provide improved utilization of space within modern commercial aircraft.

Figure 8:
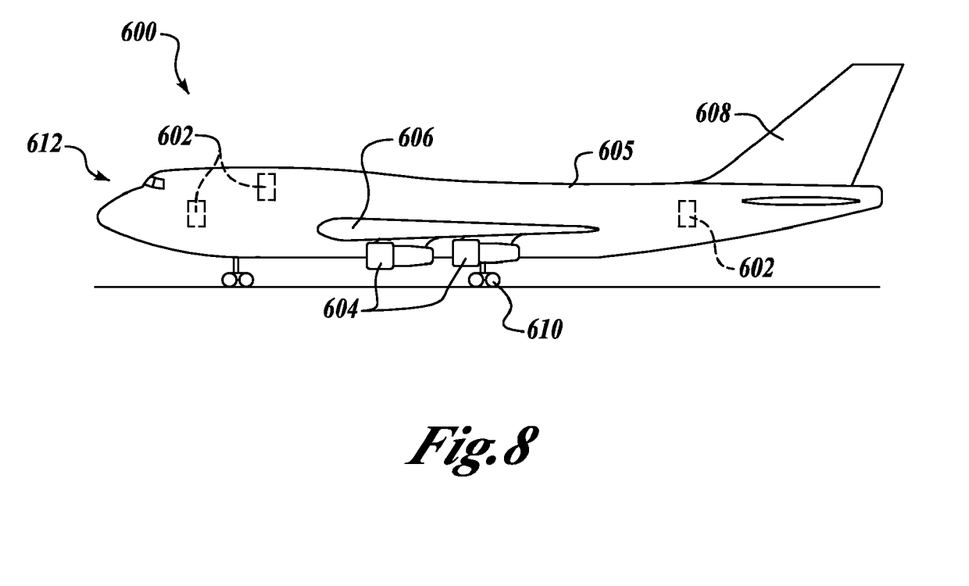
FIG. 8 is a side elevational view of an aircraft 600 in accordance with another alternate embodiment of the present invention.

Furthermore, it will be appreciated that a wide variety of apparatus may be conceived that include lavatory units in accordance with alternate embodiments of the present invention, and that the invention is not limited to the particular embodiments described above and shown in FIGS. 1-7. For example, FIG. 8 is a side elevational view of an aircraft 600 having one or more lavatory units 602 formed in accordance with alternate embodiments of the present invention. In general, except for the lavatory units formed in accordance with the present invention, the various components and subsystems of the aircraft 600 may be of known construction and, for the sake of brevity, will not be described in detail herein. Embodiments of lavatory units 602 in accordance with the present invention, including but not limited to those embodiments described above and shown in FIGS. 1-7, may be constructed as a portable unit that is mountable in a vehicle, such as the aircraft 600.

More specifically, as shown in FIG. 8, the aircraft 600 includes one or more propulsion units 604 coupled to a fuselage 605, wing assemblies 606 (or other lifting surfaces), a tail assembly 608, a landing assembly 610, a control system 612 (not visible), and a host of other systems and subsystems that enable proper operation of the aircraft 600. A plurality of lavatory units 602 formed in accordance with the present invention are located within the fuselage 605 and distributed throughout the various portions of the aircraft 600.

Although the aircraft 600 shown in FIG. 8 is generally representative of a commercial passenger aircraft, including, for example, the 737, 747, 757, 767, 777, and 7E7 models commercially-available from The Boeing Company of Chicago, Ill., the inventive apparatus and methods disclosed herein may also be employed in the assembly of virtually any other types of aircraft. More specifically, the teachings of the present invention may be applied to the manufacture and assembly of other passenger aircraft, cargo aircraft, rotary aircraft, and any other types of aircraft, including those described, for example, in The Illustrated Encyclopedia of Military Aircraft by Enzo Angelucci, published by Book Sales Publishers, September 2001, and in Jane's All the World's Aircraft published by Jane's Information Group of Coulsdon, Surrey, United Kingdom, which texts are incorporated herein by reference. It may also be appreciated that alternate embodiments of apparatus and methods in accordance with the present invention may be utilized in the other applications, including, for example, ships, buses, trains, recreational vehicles, subways, monorails, or any other desired application.

While preferred and alternate embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

What is claimed is:

1. A lavatory unit, comprising:
   a floor;
   a ceiling;
   a plurality of exterior walls coupled to the floor and the ceiling, at least two of the exterior walls lying in intersecting planes;
   a first section including a sit-down commode and a first door mounted to a first exterior wall;
   a second section including at least one of a sink, a standing urinal, and a second door mounted to a second exterior wall, the first exterior wall and the second exterior wall being approximately orthogonal; and
   a divider wall coupled to the floor and the ceiling, the divider wall configured to separate the first and second sections, wherein the divider wall includes at least one of:
   a nonplanar divider wall; and
   a planar divider wall, wherein the planar divider wall lies in a third plane intersecting both of the intersecting planes.

2. The unit of claim 1, wherein the first section includes a sink.

3. The unit of claim 1, wherein the first section includes a foldable baby changing table.

4. The unit of claim 1, further comprising:
   a third section that shares a first shared wall with the first section and a second shared wall with the second section, wherein the third section is accessible from outside of the first section and the second section.

5. The unit of claim 4, wherein the third section includes drinking fountain.

6. The unit of claim 4, wherein the third section includes a trash compartment.

7. The unit of claim 1, wherein the unit is configured to mount in a vehicle.

8. The unit of claim 7, wherein the vehicle is an aircraft.

9. The unit of claim 1, wherein the divider wall comprises an arcuate wall.

10. A lavatory unit, comprising:
    a floor;
    a ceiling;
    a plurality of exterior walls coupled to the floor and the ceiling, at least two of the exterior walls lying in intersecting planes;
    a first section including a sit-down commode;
    a second section including at least one of a sink and a standing urinal; and
    a divider wall coupled to the floor and the ceiling, the divider wall configured to separate the first and second sections, wherein the divider wall includes at least one of:
    a nonplanar divider wall; and
    a planar divider wall, wherein the planar divider wall lies in a third plane intersecting both of the intersecting planes; and
    a third section that shares a first shared wall with the first section and a second shared wall with the second section, wherein the third section is accessible from outside of the first section and the second section; and includes a trash compartment accessible to the first and second sections through openings in the respective shared walls.

11. The unit of claim 10, wherein the trash compartment includes a trash compactor.

12. The unit of claim 11, wherein the trash compactor is at least one of an electrically powered or manual trash compactor.

13. A lavatory unit, comprising:
    a floor;
    a ceiling;
    a plurality of exterior walls coupled to the floor and the ceiling, at least two of the exterior walls lying in intersecting planes;
    a first section including a sit-down commode;
    a second section including at least one of a sink and a standing urinal; and
    a divider wall coupled to the floor and the ceiling, the divider wall configured to separate the first and second sections, wherein the divider wall includes at least one of:
    a nonplanar divider wall comprising an arcuate wall, wherein the arcuate wall includes a concave portion proximate a center portion of the second section; and
    a planar divider wall, wherein the planar divider wall lies in a third plane intersecting both of the intersecting planes.

14. A lavatory unit, comprising:
    a first section having a sit-down commode operatively disposed therein;
    a second section adjacent to the first section and having at least one of a sink and a standing urinal operatively disposed therein;
    a divider wall that separates the first section from the second section, such that the second section is inaccessible from the first section, the divider wall being a common wall to both the first and second sections; and
    a third section that shares a first shared wall with the first section and a second shared wall with the second section, wherein the third section includes a trash compartment accessible to the first and second sections through openings in the respective shared walls.

15. The unit of claim 14, wherein the first section includes a sink.

16. The unit of claim 14, wherein the first section includes a foldable baby changing table.

17. The unit of claim 14, wherein the first section includes a door mounted to a first exterior wall and the second section includes a door mounted to a second exterior wall, the first exterior wall and the second exterior wall are approximately orthogonal.

18. The unit of claim 14, wherein the unit is configured to mount in a vehicle.

19. The unit of claim 14, wherein the divider wall comprises an arcuate wall.

20. The unit of claim 19, wherein the arcuate wall includes a concave portion proximate a center portion of the second section.

21. An aircraft, comprising:
a fuselage;
a propulsion system operatively coupled to the fuselage; and
at least one lavatory unit operatively disposed within the fuselage, the lavatory unit comprising:
a plurality of exterior walls separating the sections of the lavatory unit from other portions of the aircraft, the plurality of exterior walls defining a footprint of the lavatory unit;
a sitting lavatory section including a sit-down commode and partially occupying the footprint, wherein the sitting lavatory includes a first door mounted to a first exterior wall;
a standing lavatory section adjacent including at least one of a sink and a standing urinal and partially occupying the footprint, wherein the standing lavatory includes a second door mounted to a second exterior wall, the first exterior wall and the second exterior wall being approximately orthogonal; and
an adjoining divider wall configured to separate the lavatory unit into the sitting and standing lavatory sections, the divider being disposed such that the standing lavatory section occupies a minority portion of the footprint and the standing lavatory section is inaccessible from the sitting lavatory section.

22. The aircraft of claim 21, wherein the sitting lavatory section includes a sink.

23. The aircraft of claim 21, wherein the sitting lavatory section includes a foldable baby changing table.

24. The aircraft of claim 21, wherein the lavatory unit further comprises a third section that shares a wall with the sitting lavatory section and a wall with the standing lavatory section, wherein the third section is accessible from outside of the sitting lavatory section and the standing lavatory section.

25. An aircraft, comprising:
a fuselage;
a propulsion system operatively coupled to the fuselage; and
at least one lavatory unit operatively disposed within the fuselage, the lavatory unit comprising:
a plurality of exterior walls separating the sections of the lavatory unit from other portions of the aircraft, the plurality of exterior walls defining a footprint of the lavatory unit;
a sitting lavatory section including a sit-down commode and partially occupying the footprint;
a standing lavatory section adjacent including at least one of a sink and a standing urinal and partially occupying the footprint; and
an adjoining divider wall configured to separate the lavatory unit into the sitting and standing lavatory sections, the divider being disposed such that the standing lavatory section occupies a minority portion of the footprint and the standing lavatory section is inaccessible from the sitting lavatory section, wherein the divider wall comprises an arcuate wall.

26. The aircraft of claim 25, wherein the arcuate wall includes a concave portion proximate a center portion of the standing lavatory section.

* * * * *